US011636844B2

United States Patent
Tu et al.

(10) Patent No.: US 11,636,844 B2
(45) Date of Patent: Apr. 25, 2023

(54) METHOD AND APPARATUS FOR AUDIO SIGNAL PROCESSING EVALUATION

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 120 days.

(21) Appl. No.: 17/165,940

(22) Filed: Feb. 3, 2021

(65) Prior Publication Data
US 2022/0208171 A1    Jun. 30, 2022

(30) Foreign Application Priority Data
Dec. 25, 2020 (TW) ................................ 109146186

(51) Int. Cl.
| G10L 13/02 | (2013.01) |
| G10L 15/26 | (2006.01) |
| G10L 21/02 | (2013.01) |
| G10L 25/51 | (2013.01) |

(52) U.S. Cl.
CPC .............. *G10L 13/02* (2013.01); *G10L 15/26* (2013.01); *G10L 21/02* (2013.01); *G10L 25/51* (2013.01)

(58) Field of Classification Search
CPC ......... G10L 13/02; G10L 21/02; G10L 25/51; G10L 15/26
See application file for complete search history.

(56) References Cited

U.S. PATENT DOCUMENTS

| 2008/0004882 | A1 | 1/2008 | Papadimitriou et al. |
| 2012/0022676 | A1* | 1/2012 | Ishikawa ................. G06F 17/00 700/95 |
| 2015/0120307 | A1* | 4/2015 | Yamamamoto ......... G10L 21/02 |
| 2018/0342258 | A1* | 11/2018 | Huffman ................ G10L 21/013 |
| 2019/0051299 | A1* | 2/2019 | Ossowski ............... G10L 15/22 |

(Continued)

FOREIGN PATENT DOCUMENTS

| CN | 104732977 | 6/2015 |
| CN | 106201424 | 12/2016 |

(Continued)

*Primary Examiner* — Richemond Dorvil
*Assistant Examiner* — Ethan Daniel Kim
(74) *Attorney, Agent, or Firm* — JCIPRNET

(57) ABSTRACT

A method and an apparatus for audio signal processing evaluation are provided. The audio signal processing is performed on a synthesized audio signal to generate a processed audio signal. The synthesized audio signal is generated by adding a secondary signal into a master signal. The master signal is merely a speech signal. The signal processing is related to removing the secondary signal from the synthesized audio signal. The sound characteristics of the processed audio signal and the master signal are obtained, respectively. The sound characteristics include text content, and the text content is generated by performing speech-to-text on the processed audio signal and the master signal. The audio signal processing is evaluated according to the compared result between the sound characteristics of the processed audio signal and the master signal. The compared result includes the correctness of the text content of the processed audio signal relative to the master signal.

11 Claims, 3 Drawing Sheets

(56) References Cited

U.S. PATENT DOCUMENTS

2019/0279642 A1* 9/2019 Shukla .................... G10L 15/32
2019/0385608 A1* 12/2019 Lee ......................... G10L 15/22
2021/0152534 A1* 5/2021 Xie ......................... H04L 29/06

FOREIGN PATENT DOCUMENTS

| CN | 108806715 | 11/2018 |
| CN | 111031463 | 4/2020 |
| TW | 201725580 | 7/2017 |

* cited by examiner

METHOD AND APPARATUS FOR AUDIO SIGNAL PROCESSING EVALUATION

CROSS-REFERENCE TO RELATED APPLICATION

This application claims the priority benefit of Taiwan application serial no. 109146186, filed on Dec. 25, 2020. The entirety of the above-mentioned patent application is hereby incorporated by reference herein and made a part of this specification.

BACKGROUND

1. Technical Field

The disclosure relates to a signal analysis technology, and particularly relates to a method and apparatus for audio signal processing evaluation.

2. Description of Related Art

There are many speakers, headphones or other multimedia players on the market that offer noise signal or noise cancellation techniques. The noise signal or noise cancellation techniques introduced by different suppliers may involve different algorithms or mechanisms, and may achieve different results. However, there are no solutions available to objectively evaluate different elimination techniques.

SUMMARY

In view of this, the embodiments of the invention provide an audio signal processing evaluation method and apparatus, which provides objective evaluation for the audio signal processing of speech-related signals.

The audio signal processing module of the embodiment of the disclosure includes (but not limited to) performing an audio signal processing on a synthesized audio signal so as to generate a processed audio signal. The synthesized audio signal is generated by adding a secondary signal into a master signal. The master signal is merely a speech signal. The audio signal processing is related to removing the secondary signal from the synthesized audio signal. The sound characteristics of the processed audio signal and the master signal are obtained, respectively. The sound characteristics include text content, and the text content is generated by performing speech-to-text on the processed audio signal and the master signal. The audio signal processing is evaluated according to the compared result between the sound characteristics of the processed audio signal and the master signal. The compared result includes the correctness of the text content of the processed audio signal relative to the master signal.

The audio signal processing and evaluating apparatus of the embodiment of the present invention includes (but is not limited to) a memory and a processor. The memory is used to store several software modules. The processor is coupled to the storage and used to load and execute the software modules. Those software modules include audio signal processing modules, feature extraction modules, and evaluation modules. The audio signal processing module performs an audio signal processing on a synthesized audio signal to generate a processed audio signal. The synthesized audio signal is generated by adding a secondary signal into a master signal. The master signal is merely a speech signal. The audio signal processing is related to removing the secondary signal from the synthesized audio signal. The feature extraction module obtains sound characteristics and for the processed audio signal and the main signal respectively. The sound characteristics include text content, and the text content is generated by performing speech-to-text on the processed audio signal and the master signal. The audio signal processing is evaluated according to the compared result between the sound characteristics of the processed audio signal and the master signal. The compared result includes the correctness of the text content of the processed audio signal relative to the master signal.

Base on the above, in the audio signal processing evaluation method and apparatus of the embodiment of the disclosure, the difference in sound characteristics of the speech-related original signal and of the processed audio signal can be analyzed, and the quality of the audio signal processing is determined based on the correctness of text/recognition and the voiceprint similarity. The text difference between the two signals after the speech-to-text can be determined. In this way, it is suitable for evaluating audio signal processing related to speech signals.

In order to make the above-mentioned characteristics of the disclosure more obvious and understandable, the embodiments are specifically described below in conjunction with the accompanying drawings for detailed description as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
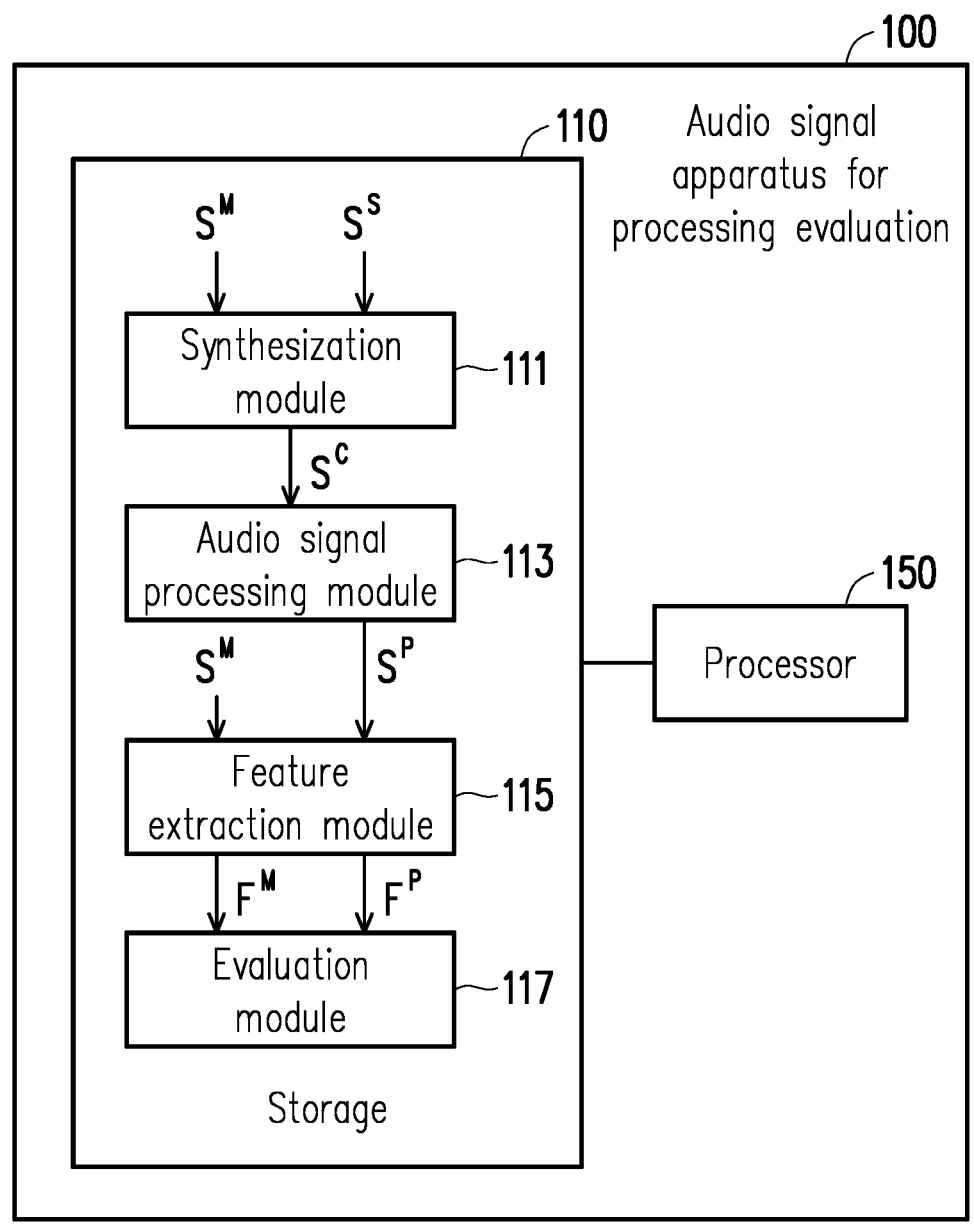
FIG. 1 is a block diagram of an audio signal apparatus for processing evaluation according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a block diagram of an audio signal apparatus for processing evaluation 100 according to an embodiment of the disclosure. Referring to FIG. 1, the audio signal apparatus for processing evaluation 100 includes (but is not limited to) a storage 110 and a processor 150. The audio signal apparatus for processing evaluation 100 may be a desktop computer, a notebook computer, an AIO computer, a smart phone, a tablet computer, or a server.

The storage 110 may be any type of fixed or removable random access memory (RAM), read only memory (ROM), flash memory, traditional hard disk drive (HDD), solid-state drive (SSD), or similar components. In one embodiment, the storage 110 is configured to record program codes, software modules (for example, a synthesization module 111, an audio signal processing module 113, a feature extraction module 115, and an evaluation module 117), configuration, data or files (for example, audio signal, sound characteristics, and evaluation results), which will be detailed in subsequent embodiments.

The processor 150 is coupled to the storage 110. The processor 150 may be a central processing unit (CPU), a graphics processing unit (GPU), or other programmable general-purpose or special-purpose micro-processors, digital signal processor (DSP), programmable controller, field programmable logic gate array (FPGA), application-specific integrated circuit (ASIC), neural network accelerator, or other similar components, or a combination of the above components. In one embodiment, the processor 150 is configured to execute all or part of the operations of the audio signal apparatus for processing evaluation 100, and may load and execute various program codes, software modules, files, and data recorded by the storage 110.

Hereinafter, various components, modules, and signals in the audio signal apparatus for processing evaluation 100 will be used to describe the method according to the embodiment of the disclosure. Each process of the method may be adjusted accordingly depending on the implementation situation, and is not limited to thereto.

Figure 2:
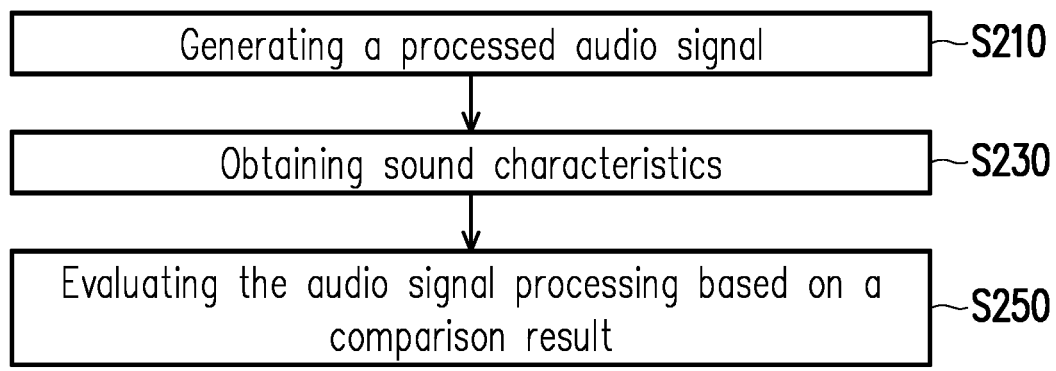
FIG. 2 is a flowchart of a method for audio signal processing evaluation according to an embodiment of the disclosure.

FIG. 2 is a flowchart of a method for audio signal processing evaluation according to an embodiment of the disclosure. Referring to FIG. 2, the audio signal processing module 113 performs audio signal processing on a synthesized audio signal $S^C$ so as to generate a processed audio signal $S^P$ (step S210). Specifically, the synthesized audio signal $S^C$ is generated by the synthesization module 111 adding a secondary signal $S^S$ to a main signal $S^M$. That is, synthesizing the main signal $S^M$ and the secondary signal $S^S$ may generate a synthesized audio signal $S^C$. It is supposed that the main signal $S^M$ is merely a speech signal, which is a pure human voice, and the secondary signal $S^S$ may be sounds made by creatures (for example, dogs, cats, or babies), non-living things (for example, air conditioners, hair dryers, or refrigerators), synthetic sounds, and environmental sounds (for example, wind, tree branches flapping, etc.), sounds of interaction between objects (for example, finger tapping the keyboard, bowl falling to the ground, etc.) or a combination thereof. Any sound other than the main signal $S^M$ may be regarded as the secondary signal $S^S$.

In one embodiment, the synthesization module 111 may, for example, superimpose the two signals $S^M$ and $S^S$ on the spectrum or use other synthesis techniques. In another embodiment, the audio signal apparatus for processing evaluation 100 may simultaneously play the main signal $S^M$ and the secondary signal $S^S$ through a built-in or external speaker, and further record the two signals, so as to obtain the synthesized audio signal $S^C$.

On the other hand, in one embodiment, the audio signal processing performed by the audio signal processing model 113 on the synthesized audio signal $S^C$ is related to filtering the secondary signal $S^S$ from the synthesized audio signal $S^C$. For example, one of the purposes of the audio signal processing is to restore the main signal $S^M$ or eliminate noise. Noise reduction and suppression (or audio source separation) technology may be, for example, to generate a signal with an opposite phase of a noise audio wave, or to eliminate noise from the synthesized audio signal $S^C$ (i.e. the secondary signal $S^S$) with an independent component analysis (ICA). The embodiments of the disclosure is not limited thereto.

It is worth noting that the audio signal processing based on different technologies may have differences in frequency, waveform or amplitude of the output signal from the same input signal. To evaluate multiple audio signal processing technologies, the audio signal processing module 113 may integrate the audio signal processing technologies, and use different audio signal processing technologies to process the synthesized audio signal $S^C$. Further, to understand the filtering ability of a specific audio signal processing on different secondary signals $S^S$, different secondary signals $S^s$ may be added separately.

In one embodiment, the audio signal apparatus for processing evaluation 100 may play the main signal $S^M$ and the processed audio signal $S^P$ through the built-in or external speaker and further record the two signals $S^M$ and $S^P$ respective for subsequent analysis.

The feature extraction module 115 may obtain sound characteristics $F^P$ and $F^M$ for the processed audio signal $S^P$ and the main signal $S^M$ respectively (step S230). Specifically, the evaluation basis of the evaluation is such that the voiceprint feature of the main speech can still be saved after the audio signal is processed, and the semantic recognition can be improved. In one embodiment, the sound characteristics $F^P$ and $F^M$ include the voiceprint feature. The feature extraction module 115, for example, uses linear predictive coefficient (LPC), cepstrum coefficient, mel-frequency cepstrum coefficient (MFCC), or other feature parameter extraction methods so as to obtain the voiceprint feature. The voiceprint feature may be used to distinguish the voices of different people. It can be seen that one of the judgment basis for the evaluation is such that the listener can recognize the same person corresponding to the main signal $S^M$ after listening to the processed audio signal $S^P$.

Figure 3:
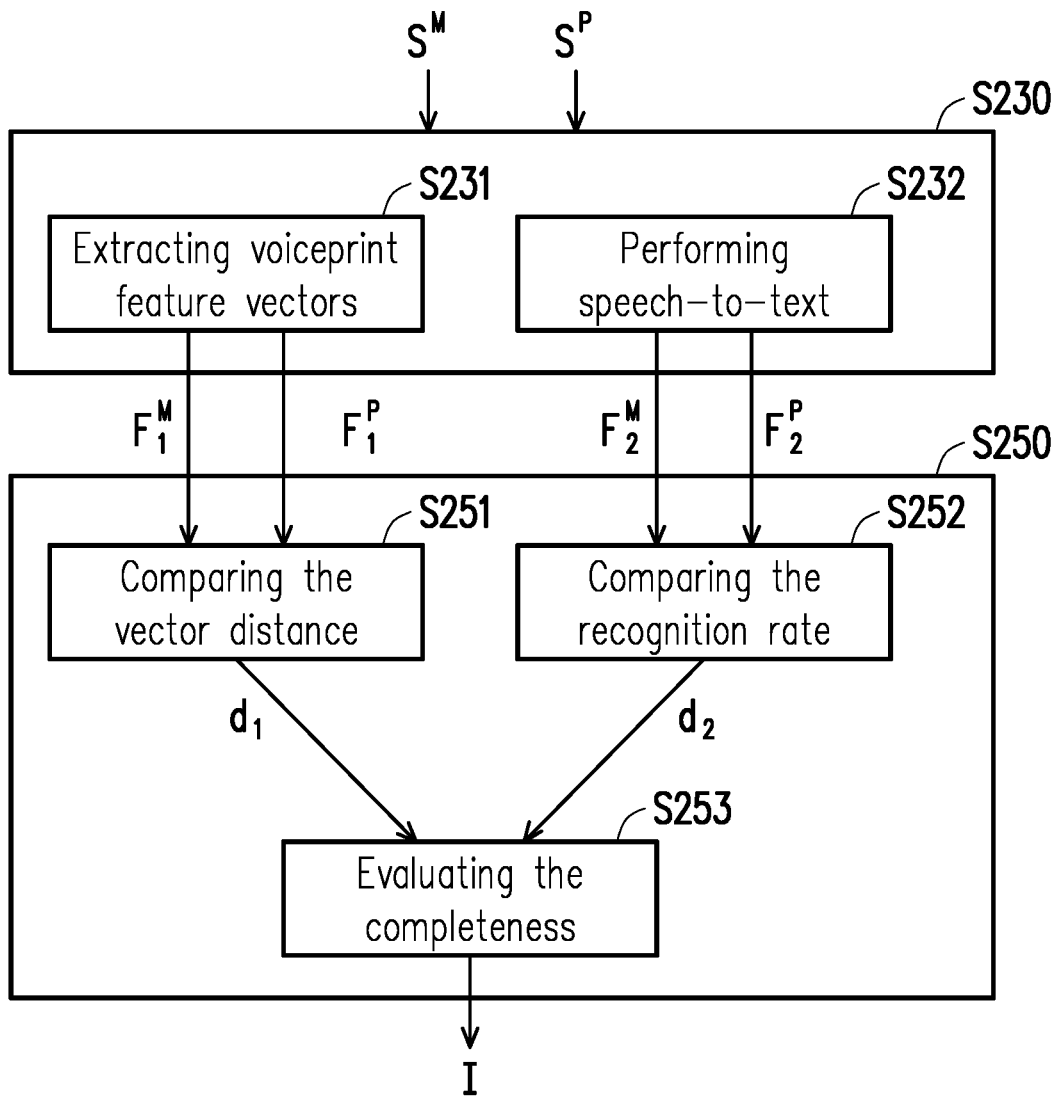
FIG. 3 is a flowchart of comparison and evaluation according to an embodiment of the disclosure.

FIG. 3 is a flowchart of comparison and evaluation according to an embodiment of the disclosure. Referring to FIG. 3, in one embodiment, the feature extraction module 115 may further convert the voiceprint feature of the processed audio signal $S^P$ and the main signal $S^M$ into two characteristic vectors $F_1^P$ and $F_1^M$ (step S231). For example, the feature extraction module 115 combines the voiceprint feature of some audio segments and takes an average vector as a characteristic vector.

In one embodiment, the sound characteristics $F^P$ and $F^M$ include text content. The feature extraction module 115 may perform speech-to-text on the processed audio signal $S^P$ and main signal $S^M$ so as to generate text content $F_2^P$ and text content $F_2^M$ (step S232). The speech-to-text may be based on, for example, feature extraction, acoustic models, pronunciation dictionaries, language models, decoders, or combinations thereof so as to output word strings with the largest or relatively large probability. The text content is the speech content in audio signals (expressed in text form). The text content may be used to understand semantics. It can be seen that one of the judgment basis of the evaluation lies in such that the listener can recognize the correct content corresponding to the main signal $S^M$ after listening to the processed audio signal $S^P$.

In one embodiment, the sound characteristics $F^P$ and $F^M$ include both voiceprint feature and the text content.

The evaluation module 117 may evaluate the audio signal processing performed by the audio signal processing module 113 based on a comparison result between the sound characteristics of the processed audio signal $S^P$ and the main signal $S^M$ (step S250). In one embodiment, for the voiceprint feature, the comparison result includes voiceprint similarity, and the evaluation module 117 may compare the voiceprint similarity of the voiceprint feature between the processed audio signal $S^P$ and the main signal $S^M$; that is: whether the voiceprint feature of the processed audio signal $S^P$ is the same or similar to the voiceprint feature of the main signal $S^M$.

According to different feature extraction techniques, the method of voiceprint comparison may be different. Referring to FIG. 3, in one embodiment, the voiceprint similarity is related to a distance $d_1$ between the characteristic vector $F_1^P$ and the character vector $F_1^M$ of the processed audio signal $S^P$ and the main signal $S^M$ (step S251). For example, the distance $d_1$ is a shortest distance determined by the Euclidean Distance algorithm, but it may also be a distance between other points on the two characteristic vectors $F_1^P$ and $F_1^M$. If the value of the distance $d_1$ is smaller or the distance $d_1$ is closer, it means that the voiceprint feature of the processed audio signal $S^P$ and the main signal $S^M$ are closer. That is, the evaluation module 117 determines the closer the distance $d_1$ as the higher the voiceprint similarity and corresponding to a better evaluation result. If the value of the distance $d_1$ is larger or the distance $d_1$ is farther, it means that the voiceprint feature of the two signals $S^P$ and $S^M$ are more different. That is, the evaluation module 117 determines the farther the distance $d_1$ as the lower the voiceprint similarity and corresponding to a poorer evaluation result.

In one embodiment, for the text content, the comparison result includes correctness of the text content of the processed audio signal $S^P$ corresponding to the main signal SM, such as the correctness of the two signals $S^P$ and $S^M$ corresponding to characters in the text content.

Referring to FIG. 3, in one embodiment, the evaluation module 117 may compare a character difference in the text content $F_2^P$ and the text content $F_2^M$ of the processed audio signal $S^P$ and the main signal SM. The character difference is related to whether the corresponding characters in the text content $F_2^P$ and the text content $F_2^M$ of the two signals $S^P$ and $S^M$ are the same. The correctness of the text content $F_2^P$ and the text content $F_2^M$ is related to text correctness. The evaluation module 117 may decide text correctness $d_2$ (or recognition rate) of the processed audio signal $S^P$ relative to the main signal $S^M$ based on the character difference (step S252). For example, the text correctness rate is the ratio of the number of compared identical texts to all the characters of the text content $F_2^M$. The evaluation module 117 may determine the higher the text correctness rate $d_2$ as the higher the correctness of the text content and corresponding to the better evaluation results, and the lower the text correctness rate $d_2$ as the lower the correctness of the text content and corresponding to the poor evaluation result.

In one embodiment, the comparison result includes both the correctness of the text content and the voiceprint similarity. The evaluation module 117 may determine that the higher the voiceprint similarity and the higher the correctness of the text content, the better the evaluation result (that is, the better the audio signal processing result). Also, the evaluation module 117 may determine that the lower the voiceprint similarity or the lower the correctness of the text content, the poorer the evaluation result (that is, the poorer the audio signal processing result).

For example, the evaluation module 117 may calculate completeness I (step S253):

$$I = d_2 \cdot e^{-\alpha \cdot d_1} \quad (1)$$

$\alpha$ is a variable adjustment parameter (i.e., a constant), and the completeness I is related to the evaluation result. Assuming that text correctness $d_2$ is between 0 and 1, the completeness I will be between 0 and 1. The completeness I is related to the evaluation result. The larger the value, the better the evaluation result (for example, the characteristics of the two signals $S^P$ and $S^M$ are closer), and the smaller the value, the poorer the evaluation result (for example, the characteristics of the two signals $S^P$, $S^M$ are farther).

In this way, when applying the speech-related audio signal processing to reduce noise during the evaluation of conversation, whether the speech-related audio signal processing can simultaneously save the voiceprint feature of the main speech and improve the semantic recognition can be determined.

It should be noted that the quantitative method of the evaluation result is not limited to Formula (1) of completeness I, and can be adjusted by the user according to actual needs.

In summary, in the audio signal processing evaluation method and apparatus of the embodiment of the disclosure, the sound characteristics of the main signal and the processed audio signal are analyzed, and the quality of the audio signal processing is determined based on the correctness of text/recognition and the voiceprint similarity. Accordingly, an objective result may be provided.

The disclosure has been disclosed in the above embodiments, but they are not to limit the disclosure. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An audio signal processing evaluation method, comprising:
   performing an audio signal processing on a synthesized audio signal so as to generate a processed audio signal, wherein the synthesized audio signal is generated by adding a second signal to a main signal, the main signal is merely a speech signal, and the audio signal processing is related to filtering the secondary signal from the synthesized audio signal;
   obtaining a sound characteristics of the processed audio signal and the main signal respectively, wherein the sound characteristics comprises text content and a voiceprint feature, and the text content is generated by performing speech-to-text on the processed audio signal and the main signal; and
   evaluating the audio signal processing based on a comparison result between the sound characteristics of the processed audio signal and the main signal, wherein the comparison result comprises correctness of the text content of the processed audio signal corresponding to the main signal, the comparison result further comprises a voiceprint similarity of the voiceprint feature between the processed audio signal and of the main signal, the voiceprint similarity is related to a distance between a characteristic vector of the processed audio signal and of the main signal, and the characteristic vector is converted by the voiceprint feature;
   wherein evaluating the audio signal processing further comprises:
   comparing a character difference between the text content of the processed audio signal and of the main signal, wherein the character difference is related to whether corresponding characters in the text content are the same;
   determining a text correctness rate of the processed audio signal relative to the main signal based on the character difference, wherein the correctness of the text content is related to the text correctness rate; and determining a completeness of the processed audio signal based on $$I = d_2 \cdot e^{-\alpha \cdot d_1}$$

wherein α is a variable adjustment parameter, I is the completeness and related to an evaluation result of the audio signal processing, d1 is the distance, and d2 is the text correctness rate.

2. The method for evaluating audio signal processing as described in claim 1, wherein the text correctness rate is a ratio of a number of identical texts to all characters of the text content.

3. The audio signal processing evaluation method as described in claim 1, wherein evaluating the audio signal processing comprises:
   determining that the higher the voiceprint similarity and the higher the correctness of the text content corresponding to a better evaluation result; and
   determining that the lower the voiceprint similarity or the lower the correctness of the text content corresponding to a poorer evaluation result.

4. The audio signal processing evaluation method as described in claim 3, wherein evaluating the audio signal processing comprises:
   determining the closer the distance as the higher the voiceprint similarity; and
   determining the farther the distance as the lower the voiceprint similarity.

5. The audio signal processing evaluation method as described in claim 4, wherein evaluating the audio signal processing comprises:
   determining the closer the distance and the higher the text correctness rate as the higher the voiceprint similarity; and
   determining the farther the distance or the lower the text correctness rate as the lower the voiceprint similarity.

6. An audio signal apparatus for processing evaluation, comprising:
   a storage, storing program code; and
   a processor, coupled to the storage, loading the program code to be configured for:
      performing an audio signal processing on a synthesized audio signal so as to generate a processed audio signal, the synthesized audio signal is generated by adding a main signal to a main signal, the main signal is merely a speech signal, and the audio signal processing is related to filtering the secondary signal from the synthesized audio signal;
      obtaining a sound characteristics of the processed audio signal and the main signal respectively, wherein the sound characteristics comprises text content and a voiceprint feature, and the text content is generated by performing speech-to-text on the processed audio signal and the main signal;
      evaluating the audio signal processing based on a comparison result of the sound characteristics between the processed audio signal and the main signal, wherein the comparison result comprises a correctness rate of the text content of the processed audio signal corresponding to the main signal, and the comparison result further comprises a voiceprint similarity of the voiceprint feature between the processed audio signal and the main signal;
      comparing a character difference between the text content of the processed audio signal and of the main signal, wherein the character difference is related to whether corresponding characters in the text content are the same;
      determining a text correctness rate of the processed audio signal relative to the main signal based on the character difference, wherein the correctness of the text content is related to the text correctness rate; and
      determining a completeness of the processed audio signal based on $$I = d_2 \cdot e^{-\alpha \cdot d_1},$$

wherein the voiceprint similarity is related to a distance between a characteristic vector of the processed audio signal and of the main signal, the characteristic vector is converted by the voiceprint feature, α is a variable adjustment parameter, I is the completeness and related to an evaluation result of the audio signal processing, d1 is the distance, and d2 is the text correctness rate.

7. The audio signal apparatus for processing evaluation described in claim 6, wherein the text correctness rate is a ratio of a number of identical texts to all characters of the text content.

8. The audio signal apparatus for processing evaluation as described in claim 6, wherein the processor is further configured for:
   determining that the higher the voiceprint similarity and the higher the correctness of the text content corresponds to a better evaluation result; and
   determining that the lower the voiceprint similarity or the lower the correctness of the text content corresponds to a poorer evaluation result.

9. The audio signal apparatus for processing evaluation described in claim 8, wherein the processor is further configured for:
   determining the closer the distance as the higher voiceprint similarity; and
   determining the farther the distance as the lower voiceprint similarity.

10. The audio signal apparatus for processing evaluation described in claim 9, wherein the processor is further configured for:
    determining the closer the distance and the higher the text correctness rate as the higher the voiceprint similarity; and
    determining the farther the distance or the lower the text correctness rate as the lower the voiceprint similarity.

11. An audio signal processing evaluation method, comprising:
    performing an audio signal processing on a synthesized audio signal so as to generate a processed audio signal, wherein the synthesized audio signal is generated by adding a second signal to a main signal, the main signal is merely a speech signal, and the audio signal processing is related to filtering the secondary signal from the synthesized audio signal;
    obtaining a sound characteristics of the processed audio signal and the main signal respectively, wherein the sound characteristics comprises text content and a voiceprint feature, and the text content is generated by performing speech-to-text on the processed audio signal and the main signal; and
    evaluating the audio signal processing based on a comparison result between the sound characteristics of the processed audio signal and the main signal, wherein the comparison result comprises correctness of the text content of the processed audio signal corresponding to the main signal, the comparison result further comprises a voiceprint similarity of the voiceprint feature between the processed audio signal and of the main signal, the voiceprint similarity is related to a distance between a characteristic vector of the processed audio signal and of the main signal, and the characteristic vector is converted by the voiceprint feature;

wherein evaluating the audio signal processing further comprises:

comparing a character difference between the text content of the processed audio signal and of the main signal, wherein the character difference is related to whether corresponding characters in the text content are the same;

determining a text correctness rate of the processed audio signal relative to the main signal based on the character difference, wherein the correctness of the text content is related to the text correctness rate;

determining that the higher the voiceprint similarity and the higher the correctness of the text content corresponding to a better evaluation result;

determining that the lower the voiceprint similarity or the lower the correctness of the text content corresponding to a poorer evaluation result;

determining the closer the distance as the higher the voiceprint similarity, or determining the closer the distance and the higher the text correctness rate as the higher the voiceprint similarity;

determining the farther the distance or the lower the text correctness rate as the lower the voiceprint similarity; and determining a completeness of the processed audio signal based on $$I = d_2 \cdot e^{-\alpha \cdot d_1},$$

wherein $\alpha$ is a variable adjustment parameter, I is the completeness and related to an evaluation result of the audio signal processing, $d_1$ is the distance, and $d_2$ is the text correctness rate.

* * * * *